(12) United States Patent
Gregory

(10) Patent No.: US 10,636,210 B2
(45) Date of Patent: Apr. 28, 2020

(54) DYNAMIC CONTOUR VOLUME DEFORMATION

(71) Applicant: DreamWorks Animation LLC, Glendale, CA (US)

(72) Inventor: Arthur D. Gregory, Sherman Oaks, CA (US)

(73) Assignee: DreamWorks Animation LLC, Glendale, CA (US)

( * ) Notice: Subject to any disclaimer, the term of this patent is extended or adjusted under 35 U.S.C. 154(b) by 40 days.

(21) Appl. No.: 15/879,275

(22) Filed: Jan. 24, 2018

(65) Prior Publication Data

US 2019/0228577 A1 Jul. 25, 2019

(51) Int. Cl.
*G06T 13/20* (2011.01)
*G06T 17/20* (2006.01)
*G06T 19/20* (2011.01)

(52) U.S. Cl.
CPC ............ *G06T 17/205* (2013.01); *G06T 13/20* (2013.01); *G06T 17/20* (2013.01); *G06T 19/20* (2013.01); *G06T 2219/2021* (2013.01)

(58) Field of Classification Search
None
See application file for complete search history.

(56) References Cited

U.S. PATENT DOCUMENTS

| 6,600,487 B1 | 7/2003 | Henn |
| 8,279,239 B1 * | 10/2012 | Jensen ................... G06T 19/20 345/647 |
| 2002/0198693 A1 | 12/2002 | Marusich |
| 2012/0265510 A1 * | 10/2012 | Lepage ................ G01V 99/005 703/9 |
| 2012/0287135 A1 * | 11/2012 | Pfeifle .................. G06T 11/203 345/442 |

FOREIGN PATENT DOCUMENTS

WO 2007087445 8/2007

OTHER PUBLICATIONS

European Patent Office Application Serial No. 18158618.1, Search Report dated Sep. 13, 2018, 8 pages.

(Continued)

*Primary Examiner* — Said Broome
(74) *Attorney, Agent, or Firm* — Lee, Hong, Degerman, Kang & Waimey PC

(57) ABSTRACT

Systems and methods for dynamic contour volume deformation are disclosed. An embodiment includes applying a deformation to a point of a volumetric mesh, wherein a plurality of tessellations of the volumetric mesh are identified and wherein each tessellation is a tetrahedral mesh, identifying a deformation point associated with a first polyhedron of the volumetric mesh, determining a barycentric coordinate representation of the deformation point with respect to each tetrahedron of the plurality of tessellations, determining, for each tessellation of the first polyhedron, weight values with respect to the deformation point for vertices of each tetrahedron which correspond to natural vertices of each tetrahedron, and determining, based on the determined weight values, a new position of the identified deformation point represented as a weighted sum determined from the barycentric coordinate representations.

19 Claims, 11 Drawing Sheets

(56) References Cited

OTHER PUBLICATIONS

Wojtan, et al., "Fast Viscoelastic Behavior with Thin Features", ACM transaction on Graphics, vol. 27, No. 3, Article 47, Aug. 2008, pp. 1-8.
Parthasarathy, et al., "A comparison of tetrahedron quality measures" Finite Elements in Analysis and Design, vol. 15, No. 3, 1993, pp. 255-261.

* cited by examiner

DYNAMIC CONTOUR VOLUME DEFORMATION

BACKGROUND

Computer animation and other computer modeling applications combine two-dimensional (2D) or three-dimensional (3D) models of objects or characters and their corresponding programmed or keyframed movement. These models are constructed out of geometrical vertices, faces, and edges in a 3D coordinate system. One form of computer animation involves attaching a 3D model to a transformation hierarchy approximating a skeleton to dictate an object or a character's movement. The skeleton is surrounded by a surface mesh representing the object or character's boundaries. A 3D surface mesh may have a high level of resolution and include polygons, or faces, of various sizes making up the surface of the mesh, and the surface mesh may be shaped and deformed as required by an animator or other operator to achieve a desired result.

In one stage of animation, the surface mesh may be attached to various points of a control hull, otherwise referred to as a cage, to allow an animator to perform additional deformations of the surface mesh of the character. The cage may be made up of a large number of control points which allow an animator or other operator to control deformation or movement of the surface mesh during a particular sequence, pose, or gesture. The association of the control points and the selected points of the surface mesh may be automated or performed manually to optimize a desired deformation effect. In comparison to the surface mesh, the control points of the cage—and resulting surfaces—may be constructed at a much lower resolution, resulting in coarse deformations of the surface mesh in response to adjustment of one or more control points of the low resolution cage.

This is particularly problematic where the control points of the cage do not accurately reflect the shape of the surface mesh, or do not represent a full range of possible deformations of the surface mesh. This is most noticeable in cases where a deformation results in the surface being stretched or compressed to have a concave or convex shape where traditional techniques result in undesired uneven stretching in the convex case or self-intersection in the concave case. While some existing techniques such as subdividing the control mesh attempt to perform smoothing operations to reduce undesired artifacts resulting from these types of deformations, they still fail to accurately produce desired results in real-time, with distortions still generated particularly as the offset from the deformation surface increases.

These problems have traditionally been addressed either by performing manual adjustment to every undesired artifact resulting from a particular deformation, or by not attempting a particular movement or expression of the character as the particular deformation was deemed too impractical and costly for inclusion in large scale animation projects.

Thus, the existing systems and methods are unable to provide a solution for quickly and accurately deforming a polygonal mesh of a character in real-time. Therefore, it may be advantageous to determine deformation of a set of points in real-time based on a volume the cage.

SUMMARY

Embodiments of the present disclosure include systems, methods, and computer-readable media for deforming a set of points of a polygonal mesh based on a volume in real-time. In some embodiments, the deformation of the set of points is based on a volumetric mesh defined by points of an external polygonal mesh associated with an object connected to points inside the object. In some embodiments, the volumetric mesh is tessellated to identify every possible tessellation that results in each volume of the mesh being divided into tetrahedrons. In some embodiments, a point on a surface mesh to be deformed is embedded in a volume of the volumetric mesh adjacent to an applied deformation and the barycentric coordinates of the point are determined with respect to each of the tessellated tetrahedrons. In some embodiments, weight values are determined for each tetrahedron which are blended to consider an influence of each tetrahedron of the volume for a deformation applied to one or more of the elements of the volume.

An embodiment of a method of the present disclosure for dynamically deforming an object in real-time based on a volume includes applying a deformation to at least one point of a volumetric mesh associated with the object, wherein a plurality of tessellations of the volumetric mesh are identified and wherein each tessellation is a tetrahedral mesh, identifying a deformation point to be deformed corresponding to the applied deformation, wherein the deformation point is associated with a first polyhedron of the volumetric mesh, determining a barycentric coordinate representation of the identified deformation point with respect to each tetrahedron of a plurality of tessellations of the first polyhedron, determining, for each tessellation of the first polyhedron, weight values with respect to the deformation point for vertices of each tetrahedron which correspond to natural vertices of each tetrahedron, and determining, based on the determined weight values, a new position of the identified deformation point represented as a weighted sum of positions determined from the barycentric coordinate representations of the identified deformation point with respect to each tetrahedron of the plurality of tessellations of the first polyhedron.

An embodiment of a machine-readable non-transitory medium of the present disclosure includes machine-readable non-transitory medium having stored thereon machine-executable instructions for applying a deformation to at least one point of a volumetric mesh associated with an object to be deformed, wherein a plurality of tessellations of the volumetric mesh are identified and wherein each tessellation is a tetrahedral mesh, identifying a deformation point to be deformed corresponding to the applied deformation, wherein the deformation point is associated with a first polyhedron of the volumetric mesh, determining a barycentric coordinate representation of the identified deformation point with respect to each tetrahedron of a plurality of tessellations of the first polyhedron, determining, for each tessellation of the first polyhedron, weight values with respect to the deformation point for vertices of each tetrahedron which correspond to natural vertices of each tetrahedron, and determining, based on the determined weight values, a new position of the identified deformation point represented as a weighted sum of positions determined from the barycentric coordinate representations of the identified deformation point with respect to each tetrahedron of the plurality of tessellations of the first polyhedron.

An embodiment of a system of the present disclosure for dynamically deforming an object in real-time based on a volume includes a display configured to display information; and one or more controllers configured to receive an input of a deformation to at least one point of a volumetric mesh associated with the object, wherein a plurality of tessellations of the volumetric mesh are identified and wherein each tessellation is a tetrahedral mesh, identify a deformation point to be deformed corresponding to the applied deformation, wherein the deformation point is associated with a first polyhedron of the volumetric mesh, determine a barycentric coordinate representation of the identified deformation point with respect to each tetrahedron of a plurality of tessellations of the first polyhedron, determine, for each tessellation of the first polyhedron, weight values with respect to the deformation point for vertices of each tetrahedron which correspond to natural vertices of each tetrahedron, determine, based on the determined weight values, a new position of the identified deformation point represented as a weighted sum of positions determined from the barycentric coordinate representations of the identified deformation point with respect to each tetrahedron of the plurality of tessellations of the first polyhedron, and cause the display to display the identified deformation point at the determined new position.

Another embodiment of a method of the present disclosure for dynamically deforming a set of deformation points in real-time based on a volume includes applying a deformation to at least one point of a volumetric mesh associated with the set of deformation points, wherein a plurality of tessellations of the volumetric mesh are identified and wherein each tessellation is a tetrahedral mesh, identifying a deformation point of the set of deformation points to be deformed corresponding to the applied deformation, wherein the deformation point is associated with a first polyhedron of the volumetric mesh, determining a barycentric coordinate representation of the identified deformation point with respect to each tetrahedron of a plurality of tessellations of the first polyhedron, determining, for each tessellation of the first polyhedron, weight values with respect to the deformation point for vertices of each tetrahedron which correspond to natural vertices of each tetrahedron, and determining, based on the determined weight values, a new position of the identified deformation point represented as a weighted sum of positions determined from the barycentric coordinate representations of the identified deformation point with respect to each tetrahedron of the plurality of tessellations of the first polyhedron.

An embodiment of a machine-readable non-transitory medium of the present disclosure includes machine-readable non-transitory medium having stored thereon machine-executable instructions for applying a deformation to at least one point of a volumetric mesh associated with a set of deformation points to be deformed, wherein a plurality of tessellations of the volumetric mesh are identified and wherein each tessellation is a tetrahedral mesh, identifying a deformation point of the set of deformation points to be deformed corresponding to the applied deformation, wherein the deformation point is associated with a first polyhedron of the volumetric mesh, determining a barycentric coordinate representation of the identified deformation point with respect to each tetrahedron a plurality of tessellations of the first polyhedron, determining, for each tessellation of the first polyhedron, weight values with respect to the deformation point for vertices of each tetrahedron which correspond to natural vertices of each tetrahedron, and determining, based on the determined weight values, a new position of the identified deformation point represented as a weighted sum of positions determined from the barycentric coordinate representations of the identified deformation point with respect to each tetrahedron of the plurality of tessellations of the first polyhedron.

An embodiment of a system of the present disclosure for dynamically deforming a set of deformation points in real-time based on a volume includes a display; and one or more controllers configured to receive an input of a deformation to at least one point of a volumetric mesh associated with the set of deformation points, wherein a plurality of tessellations of the volumetric mesh are identified and wherein each tessellation is a tetrahedral mesh, identify a deformation point of the set of deformation points to be deformed corresponding to the applied deformation, wherein the deformation point is associated with a first polyhedron of the volumetric mesh, determine a barycentric coordinate representation of the identified deformation point with respect to each tetrahedron of a plurality of tessellations of the first polyhedron, determine, for each tessellation of the first polyhedron, weight values with respect to the deformation point for vertices of each tetrahedron which correspond to natural vertices of each tetrahedron, and determine, based on the determined weight values, a new position of the identified deformation point represented as a weighted sum of positions determined from the barycentric coordinate representations of the identified deformation point with respect to each tetrahedron of the plurality of tessellations of the first polyhedron.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system, method, and computer-readable medium for determining volume-based deformations of a digital model in real-time. The embodiments identify possible tessellations of a volumetric mesh associated with the digital model and blend between them using a weighting strategy which favors tetrahedrons which may enclose an embedded point to be deformed.

While this disclosure is presented in the context of 3D animation applications, it is not limited thereto, and other implementations of the systems, media, and methods described herein are contemplated, including deformation of geometric models within a 2D or 3D coordinate system, as well as for various interactive geometric modeling applications involving production and modification of geometric models, including, but not limited to, rigging, animation, architecture, automotive design, consumer product design, virtual reality applications, augmented reality applications, game development, visual effects, 3D printing, and the like. Any reference in this disclosure to a geometric model or components thereof, within a 3D model or 3D space will be understood to include the disclosure as applicable to 2D models and 2D spaces.

In this disclosure, the term "character," "object," or "model" may include any suitable computer representation or geometric model of part or all of an entity, such as a character, a landscape, an inanimate object, or any other virtual, modeled, and/or animated entity. Objects may be constructed, for example, out of geometrical vertices, edges, and/or faces in a 2D or 3D coordinate system.

A "point," "vertex," "edge," or "component" may include one of a set of elements used to determine the shape, movement, appearance, and/or absolute or relative positioning of a 3D model, including but not limited to vertices, points, edges, and faces of a 2D or 3D model. Any description of the present disclosure with respect to one of a point, a vertex, an edge, or a face will be understood to apply equally and/or analogously to the others of a point, a vertex, an edge, or a face where applicable, as will be understood by one of ordinary skill in the art, and use of one term over another within this disclosure will not be deemed to be limiting to only the term being used.

Figure 1A:
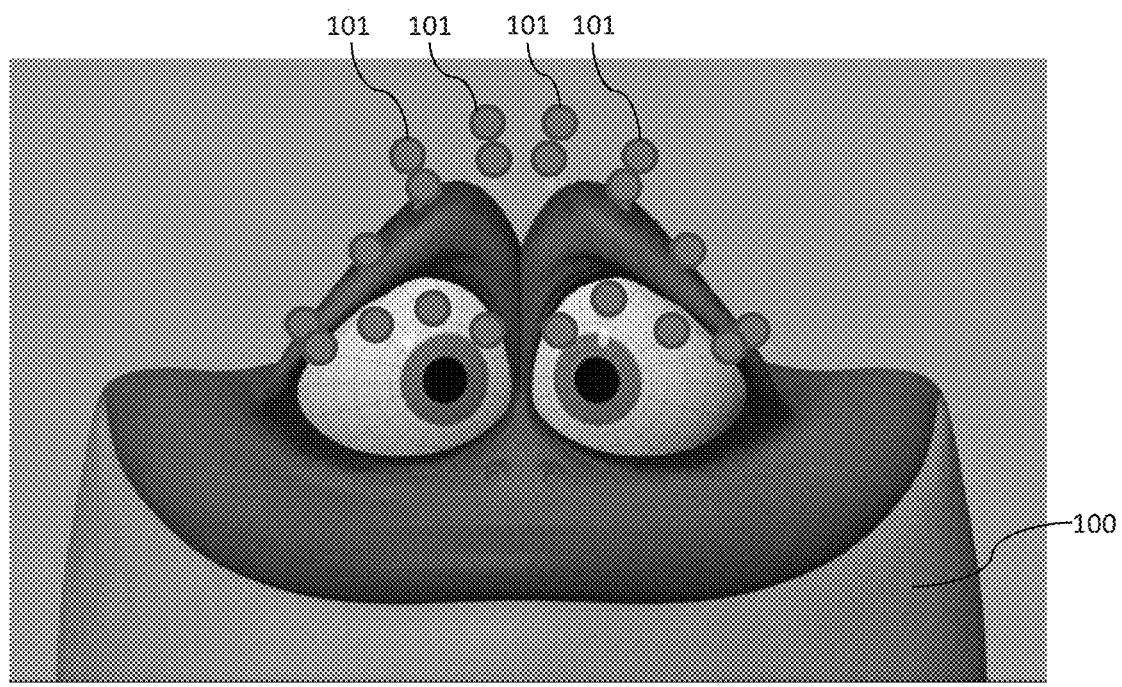
FIGS. 1A and 1B are illustrations of deformations of a character model according to the existing art.

Referring to FIG. 1A, an example of a character model 100 is shown with various control points 101 of a cage surrounding the character model 100. The points on a surface mesh representing the character model may be connected to the cage such that adjustment of a control point 101 results in deformation of the surface mesh of the character model 100. However as discussed, certain deformations performed at certain regions of the character model 100 may not perform as desired due to the inability of the cage to accurately reflect the shape of the surface mesh. This may be due to the resolution disparity between the control points 101 of the cage in comparison to the much higher resolution of the mesh of the character model 100, or due to the nature of the deformation techniques used, such as surface based attachment deformation techniques which rely on a mapping between faces connecting the control points and vertices of the character surface without considering volumetric deformation.

Figure 1B:
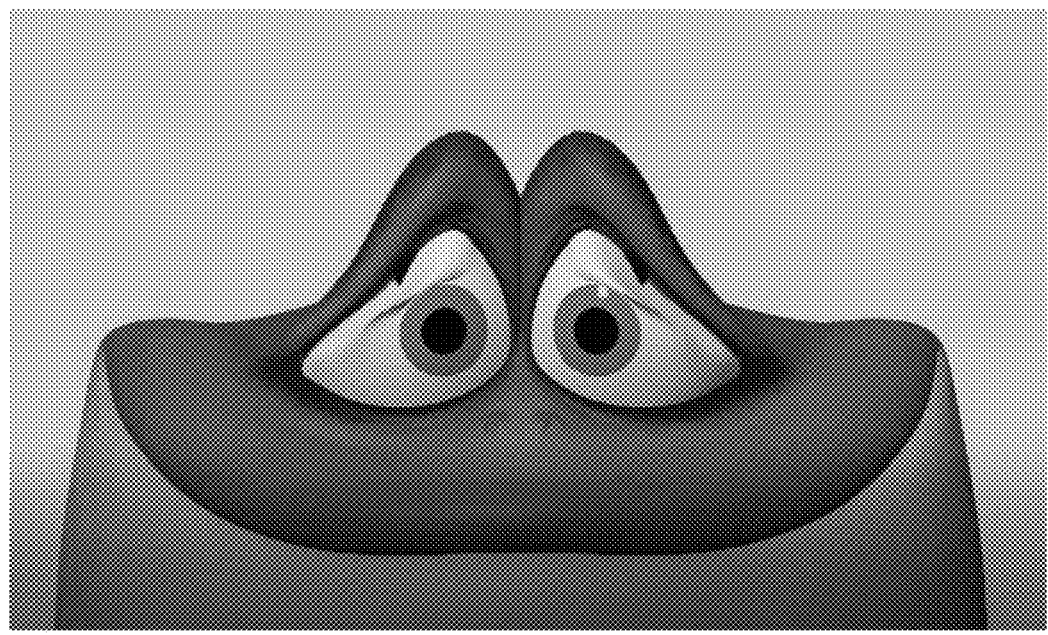

Referring to FIG. 1B, the character model 100 is shown with a compression—or squashing—deformation performed using the control points 101 of the cage using a surface-based attachment technique. As shown in the figure, undesirable artifacts and surface folding have been introduced in the eyeball area of the character. These types of artifacts may be common in regions of a character model where an underlying frame or skeleton of the character model is unable to generate a desired particular movement or gesture. This may be common in regions such as the eyes as shown in FIG. 1B where deformation can assist an animator to convey a desired expression. This disclosure is not limited thereto and considers all various desired deformations and regions of a character, object, or element which may be represented as a digital model.

As discussed further below, some embodiments of the present disclosure utilize a volumetric mesh generated by connecting control points 101 of the cage to points associated with the character model (e.g., control points may be connected to internal points within the character model or to points external to and associated with the character model). The volumetric mesh is then tessellated to determine all possible tessellations of the mesh being divided into tetrahedrons. Barycentric coordinates of each tetrahedron are used to determine a deformation point P on the surface of the character model expressed a weighted sum of the vertices for each of the tetrahedrons of the volume containing the point P. The weights of the vertices of the volume containing the point P are blended to determine an influence of an applied deformation to a point adjacent to the volume containing P. This may be performed for each point P of the surface mesh of the character model.

While utilizing all possible tessellations may be discussed herein, it will be understood that this disclosure considers other embodiments in which less than all possible tessellations may be determined or used. The number of tessellations determined or used may be determined by a specific parameter input, a variable parameter input based on certain other input parameters such as desired degree of deformation smoothness, desired speed, and the like, or it may be determined automatically based on various factors including characteristics of the surface mesh, cage, applied deformation, system resources, other tasks to be executed, and the like.

Figure 2:
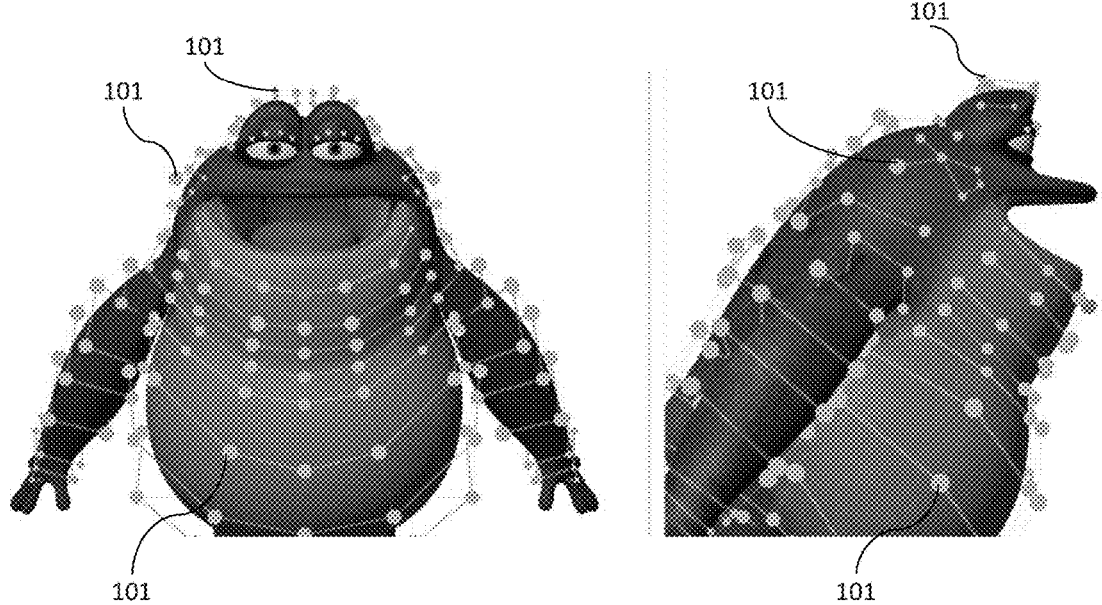
FIG. 2 is an illustration of a character model showing control points of an external cage.

Various techniques of embedding deformation points within a volumetric tetrahedral mesh are known in the art. In one example as shown in FIG. 2, the technique involves generating a volumetric mesh by connecting control points 101 of a cage corresponding to a mesh representing a character, object, or surface to points within the character, object, or surface to generate volumes with points of the surface mesh embedded within. FIG. 2 is an example showing various control points 101 of a cage external to the character. Each of the control points 101 may be defined to control one or more points on the surface of the mesh of the character, which may be manipulated by an artist or other operator, including by a program to create deformations of the character mesh.

Figure 3:
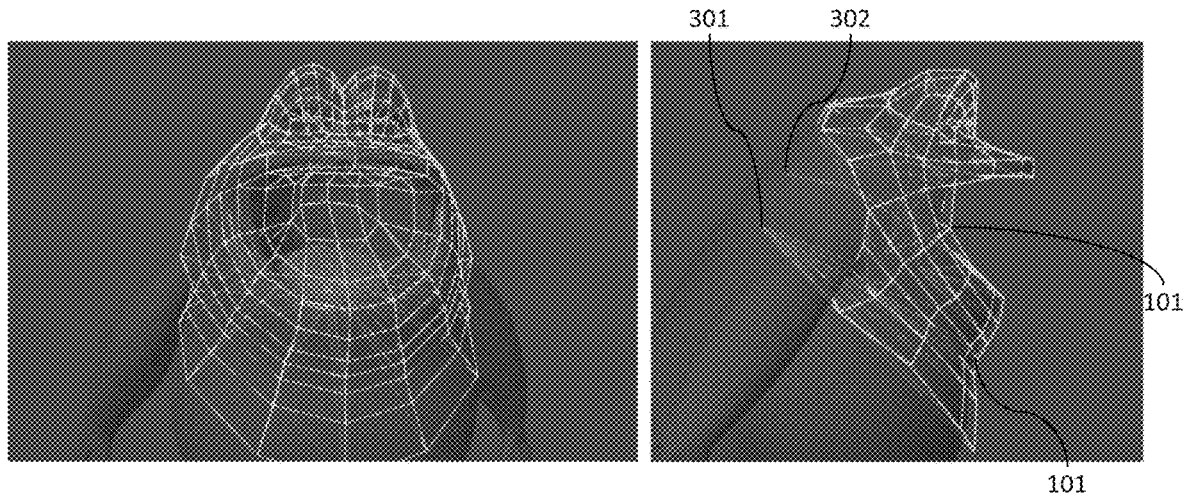
FIG. 3 is an illustration of a volumetric mesh used to deform the character model of FIG. 2.

As shown in FIG. 3, each of the control points 101 of FIG. 2 are connected to various points, for example points 301, 302, inside of the character mesh, in some cases corresponding to points of the frame, joints, or skeleton of the character which are associated with a formation or structure of the character. It is noted that FIG. 3 includes additional control points on the cage—visible in FIG. 3 as vertices—which are omitted from FIG. 2 for clarity, for example around the eye and mouth area of the character. In some embodiments, an artist or other operator may insert additional control points to the cage to generate a more detailed volumetric mesh, or the artist or other operator may choose to remove control points where detailed deformations accomplished by the present disclosure may not be required.

The frame, joints, or skeleton components may be arranged and interrelated in an interior hierarchy such that articulation or adjustment of any one of the components may result in a corresponding articulation of one or more other components, however, this disclosure considers other embodiments wherein the internal points may not be cooperatively arranged or interrelated. Volumes—otherwise referred to as polyhedrons—are generated by the connections between the control points 101 of the external cage—represented as the vertices of the cage in FIG. 3—and the internal points 301, 302 inside the character mesh. Each of the points on the surface mesh of the character may be embedded or otherwise associated with a polyhedron of the generated volumetric mesh.

Figure 4:
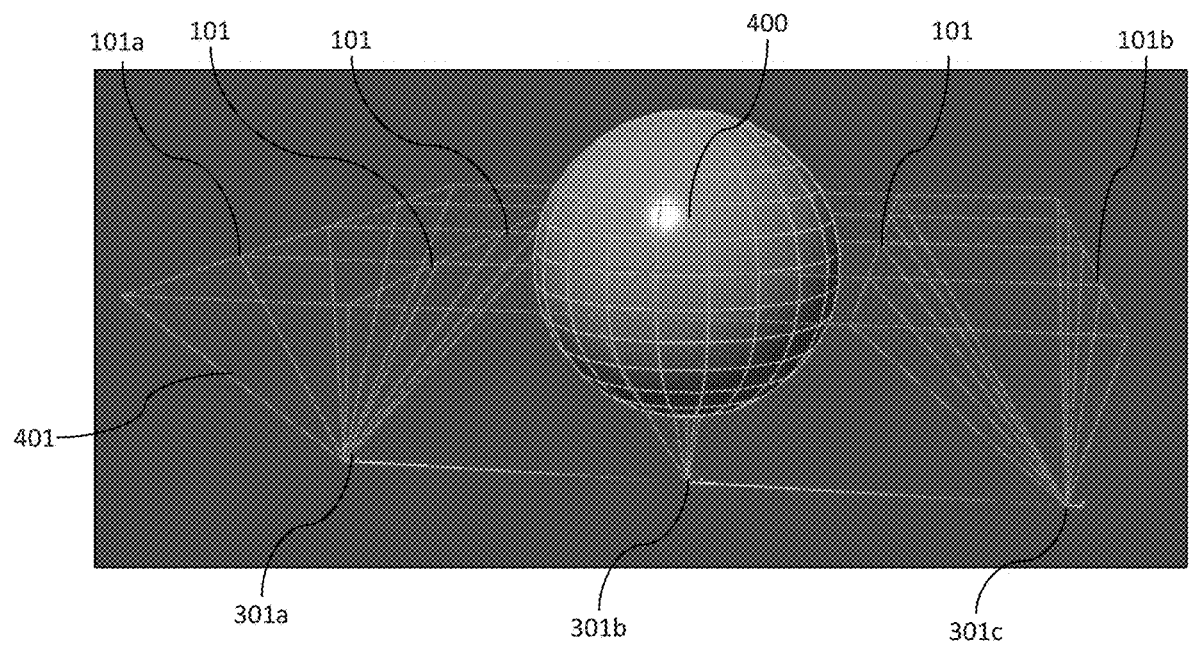
FIG. 4 is an illustration of an example of a volumetric mesh.
Figure 10A:
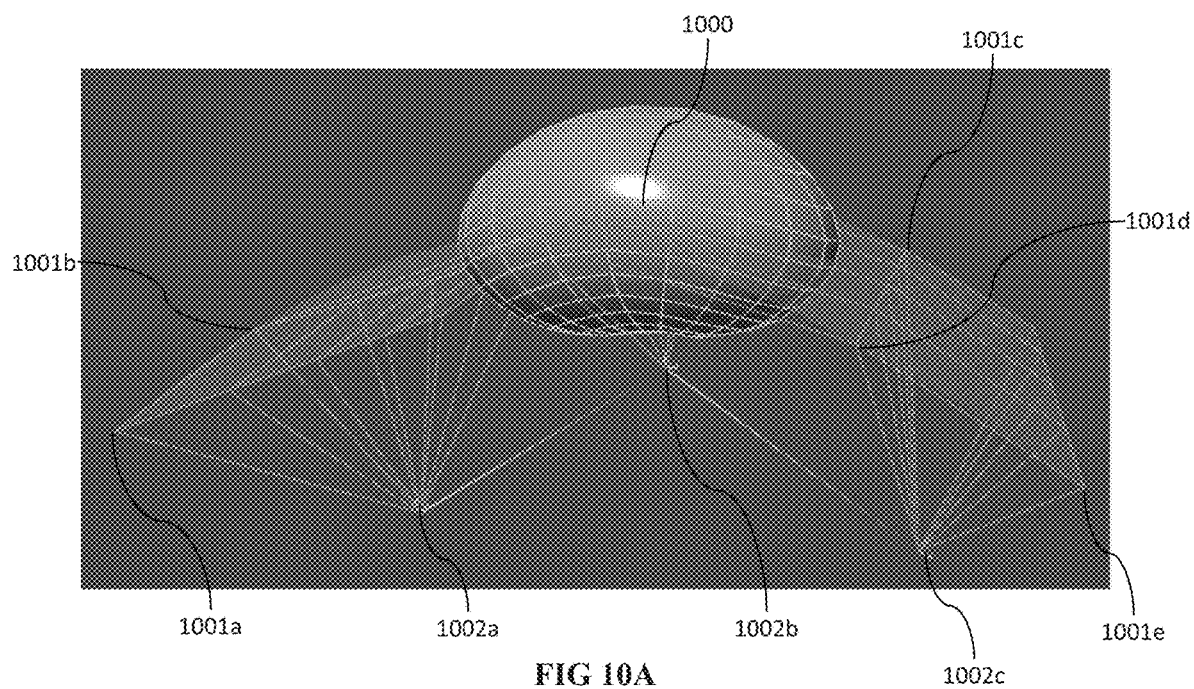
FIGS. 10A and 10B are illustrations of an optimization of an embodiment of the present disclosure.
Figure 10B:
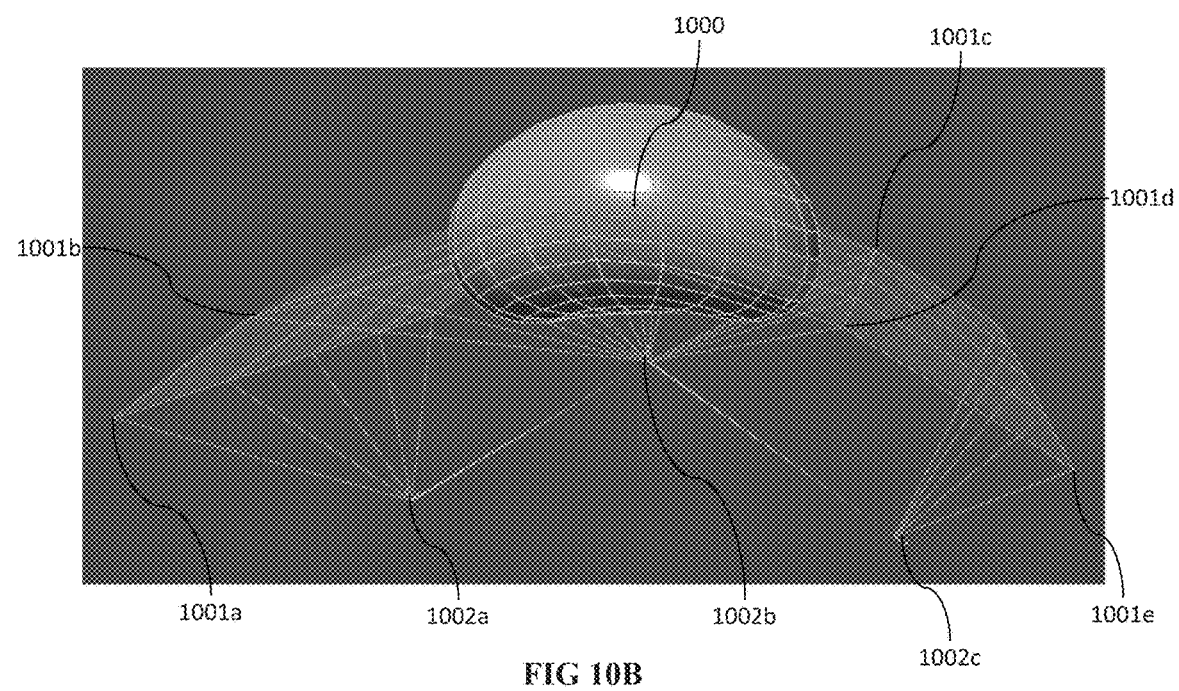

FIG. 4 is a simplified example of a volumetric mesh 401 generated for a digital model 400 of a character, object, or other animation representation. In this example, the digital model 400 may represent an object having a spherical shape which is deformable using various control points 101 of the external cage. For example, control points 101a, 101b on either side of the digital model 400 may be adjusted in a downward direction to deform the model 400 in the shape as shown in FIGS. 10A and 10B, discussed further below.

As shown in FIG. 4, the connections between the control points 101 and the internal points 301a, 301b, 301c create multiple polyhedrons incorporating the digital model 400 within a volumetric mesh. In the example of FIG. 4, each of the faces of the external cage consists of a maximum of 4 sides. Thus, the highest degree polyhedron generated in the volumetric mesh will be a hexahedron, wherein each of the vertices of a 4-sided face of the external cage is connected to a distinct point within the character mesh. Limiting the faces of the external cage to four sides allows for efficient generation of tessellation possibilities, discussed further below, however this disclosure is not limited thereto. Other embodiments are also considered wherein an external cage may exceed 4-sided quadrilateral faces, where additional techniques such as mesh subdivision are performed in pre-processing to generate a cage with a maximum of quadrilateral and triangular faces to achieve optimal performance according to the embodiments discussed herein.

Embodiments of the present disclosure include tessellating the generated volumetric mesh to find all possible tessellations resulting in each polyhedron being divided into one or more tetrahedrons in order to utilize barycentric coordinates to determine a deformation point P on a surface of the character mesh, which may be repeated for each point on a portion of the surface of the character mesh being deformed.

Figure 9A:
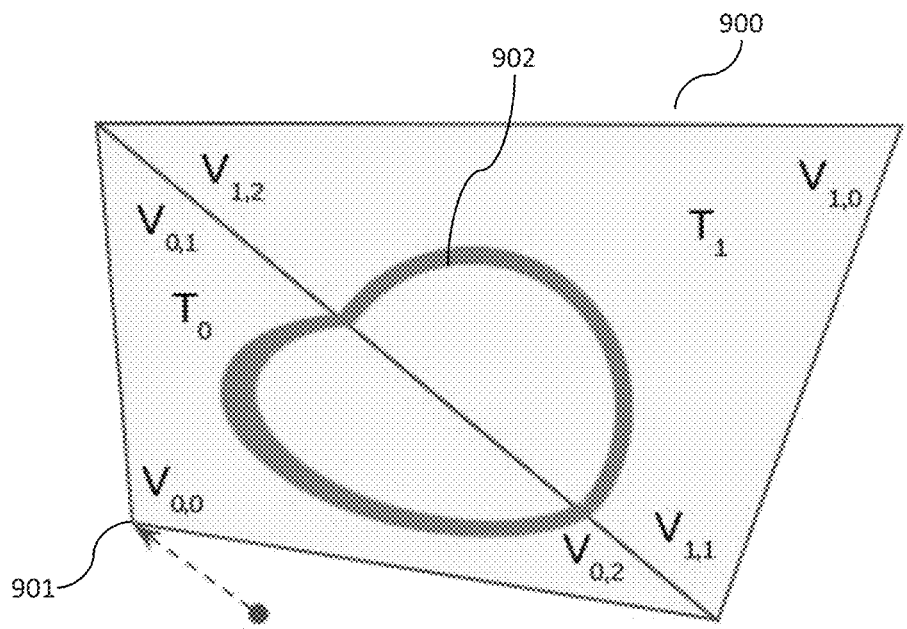
FIGS. 9A and 9B are illustrations of an applied deformation according to a surface based attachment technique and according to an embodiment of the present disclosure.

Techniques involving generating tetrahedral meshes to determine deformations may be limited to using only a single tessellation of the volumetric mesh to obtain a single tetrahedral mesh representation. Where barycentric coordinates are then determined using the single tetrahedral mesh representation, the deformation influence on deformation point P of vertices of a polyhedron which are not included in the particular tetrahedron encapsulating the deformation point P are not accurately reflected, thereby resulting in undesired deformation artifacts as depicted in FIG. 9A.

The embodiments of the present disclosure address this problem by determining all possible tessellations—or in some embodiments, a large number of tessellations less than all possible tessellations—of the volumetric mesh and blending between the weights of the vertices with respect to the barycentric coordinates of point P to determine the influence of each vertex of a polyhedron on a new position of P resulting from an applied deformation. This may be repeated for each point on a portion of the surface of the character mesh being deformed.

Figure 5:
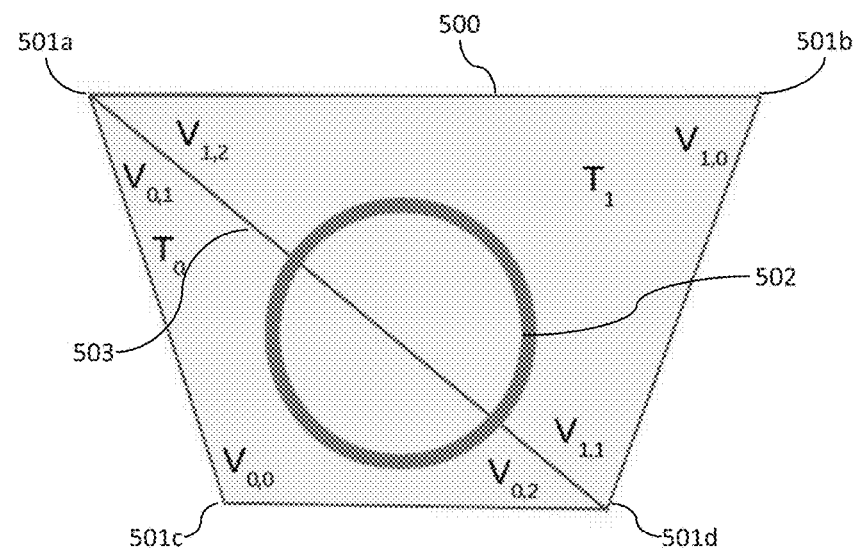
FIG. 5 is an illustration of another example of a volumetric mesh.

FIG. 5 depicts a simplified example of a tessellation of a volume, or polyhedron, generated within the volumetric mesh. The polyhedron 500 depicted in FIG. 5 is a two-dimensional representation of a side view of a hexahedron generated in the volumetric mesh by connecting control points 501a, 501b of an external cage to points 501c, 501d such that the hexahedron contains the character surface 502. In some embodiments, points 501c, 501d may be located in the interior of the character surface 502, however in other embodiments, one or more of points 501c, 501d may be located outside of character surface 502—as shown in FIG. 5. To obtain one possible tessellation, an artificial edge 503 may be inserted to connect points 501a and 501d. It is understood that another possible tessellation of the two-dimensional view of the polyhedron 500 is an edge (not depicted) inserted to connect point 501b to point 501c, thereby creating a different tessellation possibility.

In some embodiments the tessellations are limited to inserting edges only between existing vertices of the polyhedron. Thus, the number of possible tessellations may be limited in such embodiments as no artificial vertices are created by splitting edges. However, other embodiments are considered by this disclosure wherein a degree of tessellation may be increased by inserting vertices or splitting edges provided a tessellation constraint, such as a number of edge splits, number of inserted vertices, number of artificial edges or faces, or the like. In some embodiments a maximum number of tessellations may be used to limit the number of tessellations that is determined or used in the determinations discussed herein. The maximum number of tessellations may also be derived from another parameter, such as a maximum number of artificial edges, faces, or maximum degree to which a particular polyhedron is tessellated. Based on any number of such constraints, in some embodiments it may be determinable that all possible tessellations of the volume have been identified, where each tessellation results in a tetrahedral mesh. For the purposes of this discussion, all possible tessellations—without splitting edges or faces—will be discussed, however it will be understood by those of ordinary skill that the disclosure considers other variations of the tessellations, as described above.

For purposes of simplicity, FIG. 5 is shown as a two-dimensional side view of the polyhedron 500 and the artificial edge 503 results in the formation of two triangles, however it will be understood by those of ordinary skill in the art that the insertion of one or more artificial edges or artificial surfaces in the three-dimensional hexahedron space—in addition to the artificial edge 503—will result in the hexahedron being divided into a group of tetrahedrons, with two of the tetrahedrons having the two triangles shown in FIG. 5 as faces.

In some embodiments, generating the volumetric mesh and identifying all possible tessellations of the volumetric mesh into tetrahedrons (i.e., a tetrahedral mesh) may be performed prior to runtime of the deformation. The volumetric mesh and tessellation possibilities may be precomputed for a character or object at a rest state or pose and stored in a memory for use during animation runtime. As discussed further below, additional optimization embodiments may also be precomputed and stored in memory prior to animation runtime.

According to an embodiment, after all possible tessellations of the volumetric mesh are determined (each tessellation resulting in a tetrahedral mesh), an embedded point P, corresponding to a point to be deformed on a surface of the character, is identified in the volume and barycentric coordinates of point P with respect to each tetrahedron of each tetrahedral mesh of the volume are identified.

Figure 6:
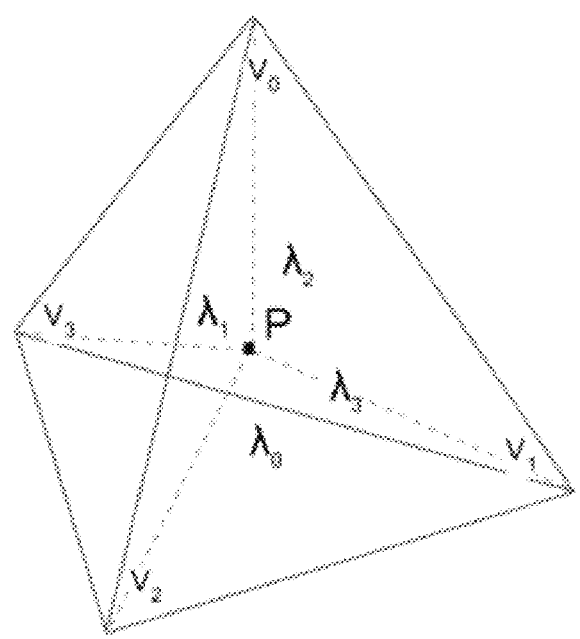
FIG. 6 is an illustration of a tetrahedron of a volumetric mesh with barycentric coordinates indicated.

FIG. 6 shows a general example of a point P embedded within a single tetrahedron generated by tessellation of a particular polyhedron. As a general concept of barycentric coordinates as applied to a tetrahedron, given point P with vector representations $V_0$, $V_1$, $V_2$, $V_3$ of each of the vertices of the tetrahedron, and ratio representations of masses of the subareas of the tetrahedron correspondingly opposite to each vector representation, shown by $\lambda_0$, $\lambda_1$, $\lambda_2$, $\lambda_3$, the barycentric coordinates of P may be represented as the sum given by Equation 1 below:

$$P=\lambda_0 V_0+\lambda_1 V_1+\lambda_2 V_2+\lambda_3 V_3 \quad \text{Equation 1:}$$

Based on this concept, the embodiments of the present disclosure obtain the barycentric coordinates for point P—representing a point on the surface of the character mesh to be deformed—with respect to each tetrahedron generated by all possible tessellations of a particular polyhedron of the volumetric mesh. The coordinates are blended as a weighted sum of positions determined from the barycentric coordinates for point P with respect to each tetrahedron based on weight values identified for each natural vertex of the particular tetrahedron—whereby a natural vertex is defined as a vertex of the tetrahedron that is not adjacent to any artificially inserted edges during the tessellation, or in some embodiments any vertex adjacent to a specified edge between an exterior cage point and another point in the volume—to determine each natural vertex's influence on the deformation of point P.

Figure 7A:
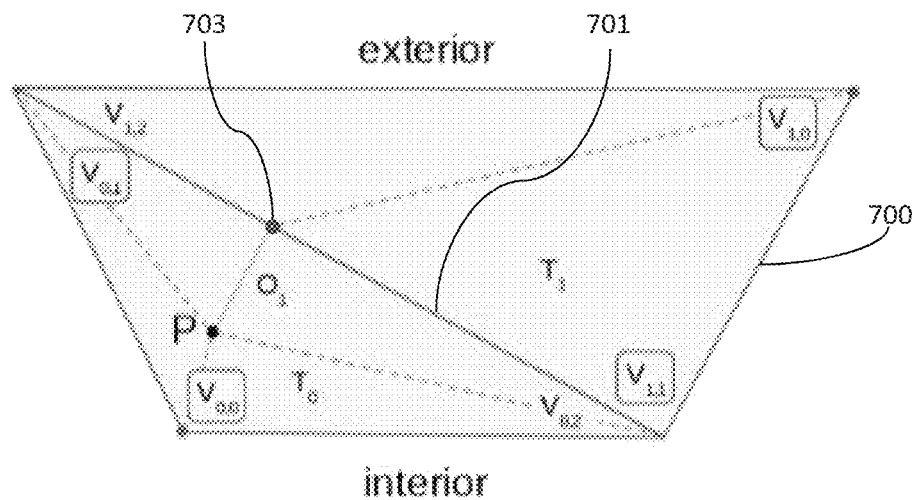
FIGS. 7A and 7B are illustrations of determining barycentric coordinates of tetrahedrons of a tessellated volume according to an embodiment of the present disclosure.
Figure 7B:
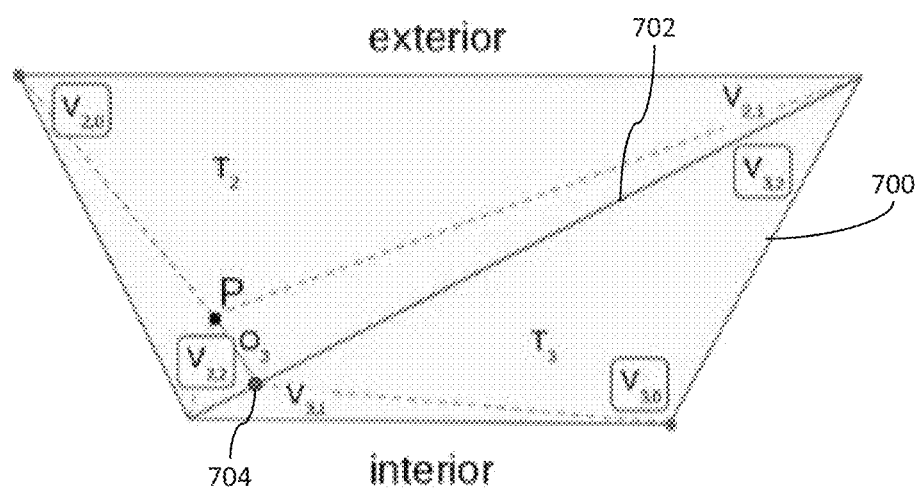

For example, FIGS. 7A and 7B show two-dimensional representations of a polyhedron 700, similar to the polyhedron discussed in FIG. 5, where barycentric coordinates for point P are identified with respect to the coordinate frames of two different tessellations of the polyhedron. Similar to FIG. 5, a two-dimensional representation is shown, however it will be understood that the view shown is a two-dimensional side view representation of a hexahedron-shaped polyhedron of the volumetric mesh, and additional edges, vertices, and divided areas of the polyhedron are considered in the example being discussed.

As a simplified example of determining weight values in a two-dimensional representation, in the tessellation example of FIG. 7A, with respect to point P, weights for the natural vertices of tetrahedron $T_0$ are computed for $V_{0,0}$ and $V_{0,1}$. However, $V_{0,2}$ is not considered a natural vertex of tetrahedron $T_0$ since $V_{0,2}$ is not adjacent to a specified edge between an exterior cage point and another point in the volume since it is only adjacent to the edge between $V_{0,0}$ and $V_{0,2}$ (an edge between two interior points) and the edge between $V_{0,1}$ and $V_{0,2}$ (an artificial edge). Similarly, for $T_1$ weights are computed for $V_{1,0}$ and $V_{1,1}$, and not computed for $V_{1,2}$ which is not a natural vertex of $T_1$. In the tessellation example of FIG. 7B, weights for point P with respect to $T_2$ are computed from vertices $V_{2,0}$ and $V_{2,2}$, and weights for point P with respect to $T_3$ are computed from vertices $V_{3,0}$ and $V_{3,2}$.

In some embodiments, P may be located outside of one or more tetrahedrons of the tessellated polyhedron, and in most cases will be located outside of all but one of the tessellated tetrahedron when P is located within the polyhedron. In some cases, P may be located outside of the polyhedron and thus be located outside of all tessellated tetrahedrons. In order to maintain a positive value for the barycentric coordinates with respect to each coordinate frame, an offset vector O may be used in some embodiments from a position of point P to the closest external face of a particular tetrahedron when a value of the barycentric coordinates is determined to be negative (outside of the tetrahedron). The closest point on the external face of the particular tetrahedron may be used as the barycentric coordinates of P for that particular tetrahedron, thereby resulting in a positive barycentric coordinate value. The offset vector O may be then computed and added onto the point computed from the positively adjusted barycentric coordinates to obtain P, as shown further below.

As an example, in FIG. 7A, P is located inside triangle $T_0$, defined by vertices ($V_{0,0}$, $V_{0,1}$, $V_{1,0}$). The barycentric coordinates for P with respect to the coordinate frame of triangle $T_0$ will be positive as P is found inside of triangle $T_0$. However, since P is located outside of triangle $T_1$, defined by vertices ($V_{1,0}$, $V_{1,1}$, $V_{1,2}$), at least one value of the barycentric coordinates for P with respect to the coordinate frame of triangle $T_1$ will be negative. To avoid negative coordinate values, in order to stabilize deformations of P as it moves away from $T_1$, offset vector $O_1$ is computed from P to the closest point 703 of triangle $T_1$. Closest point 703 is used as the barycentric coordinate position of P with respect to triangle $T_1$, resulting in non-negative values for the barycentric coordinates that lies on the edge 701. The offset vector $O_1$ is added to the point computed from the new coordinates for deformed point P with respect to the influence of triangle $T_1$ as will be shown further below.

In some embodiments, offset vector $O_1$ is defined as a vector from P to a closest point on the closest exterior edge of triangle $T_1$, resulting in $O_1$ being perpendicular to edge 701 in FIG. 7A (and similarly 702 in FIG. 7B). However, in some cases, offset vector O may not be perpendicular to the external edge of the relevant triangle, particularly where the location of P is positioned outside of vertex $V_{0,2}$, or similar vertex. In such cases, offset vector O may not be perpendicular to the closest outer edge of the relevant tetrahedron, and a non-perpendicular vector to the closest point of the tetrahedron may be used.

Accordingly, using the barycentric coordinates identified for point P—representing a point on the surface of the character mesh to be deformed—weight values are identified for each natural vertex of the tessellation, which can be identified by selecting vertices adjacent to edges connecting a point on the exterior cage to the additional points used to create the volumetric mesh, in 2D this can be simplified to vertices opposite of artificially inserted edges. Other vertices are not considered when determining weights for each tessellation.

Figure 8A:
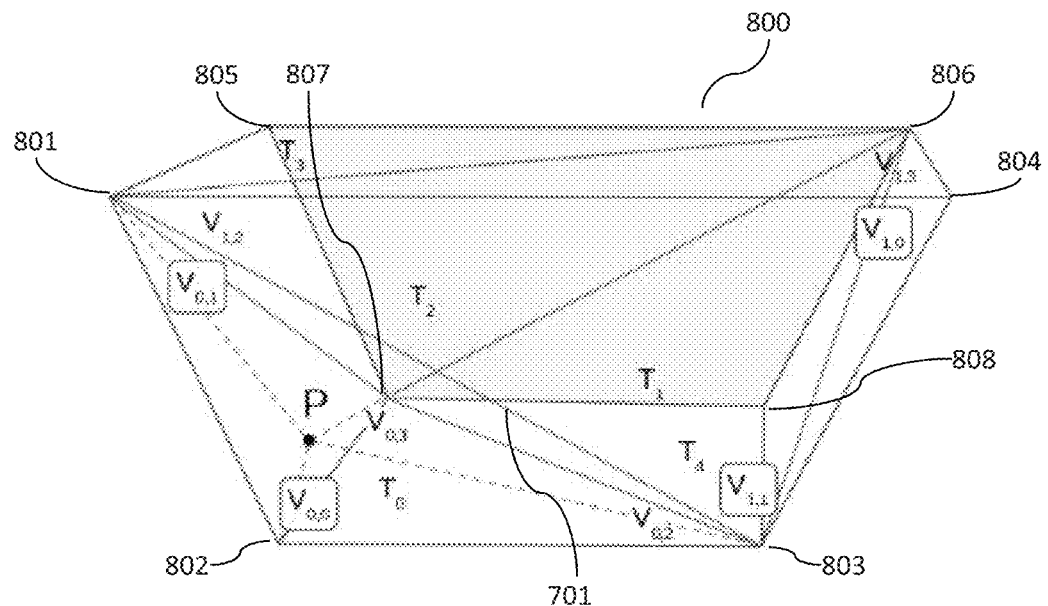
FIGS. 8A and 8B are additional illustrations of determining barycentric coordinates of tetrahedrons of a tessellated volume according to an embodiment of the present disclosure.
Figure 8B:
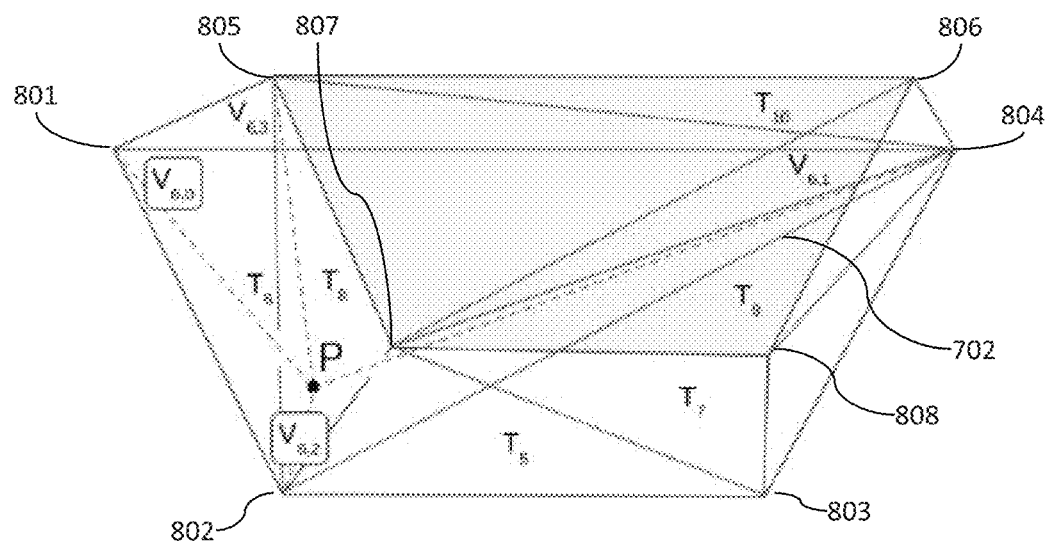

FIGS. 8A and 8B show just two tessellation possibilities of a three-dimensional hexahedral-shaped polyhedron 800 of the examples discussed in FIGS. 7A and 7B, where FIG. 8A includes the artificial edge 701 of FIG. 7A and FIG. 8B includes the artificial edge 702 of FIG. 7B. The three-dimensional hexahedral-shaped polyhedron 800 is defined in FIGS. 8A and 8B by vertices 801, 802, 803, 804, 805, 806, 807, and 808, where vertices 801, 802, 803, and 804 are located closer in the depicted perspective. The tessellation of FIG. 8A includes tetrahedrons T0, T1, T2, T3, and T4, and the tessellation of FIG. 8B includes tetrahedrons T5, T6, T7, T8, T9, and T10. Similar to the examples discussed with respect to FIGS. 7A and 7B, as an example of determining weight values, in the tessellation example of FIG. 8A, with respect to point P, weights for the natural vertices of tetrahedron $T_0$ (where $T_0$ is defined by vertices 801, 802, 803, 807) are computed for $V_{0,0}$ and $V_{0,1}$. Vertex $V_{0,2}$ is not considered a natural vertex of tetrahedron $T_0$ as it is only adjacent to interior edges (between $V_{0,0}$ and $V_{0,2}$) or artificial edges (between $V_{0,1}$ and $V_{0,2}$ or $V_{0,3}$ and $V_{0,2}$). Similarly, for tetrahedron $T_1$ (where $T_1$ is defined by vertices 801, 803, 804, 806) weights are computed for $V_{1,0}$ and $V_{1,1}$. In the tessellation example of FIG. 8B, weights for point P with respect to tetrahedron $T_6$ (where T6 is defined by vertices 801, 802, 804, 805) are computed from vertices $V_{6,0}$ and $V_{6,2}$.

A weight value $W_i$ for a particular natural vertex $V_{i,0}$ is determined by the following Equation 2:

$$W_i = \frac{1}{|P - V_{i,0}|} \quad \text{Equation 2}$$

As shown in Equation 2, the weight of a particular natural vertex $V_{i,0}$ is determined as the inverse of a distance of the vertex $V_{i,0}$ from point P. Even where an offset vector is used for a point P with respect to a particular tetrahedron, the inverse distance from point P to a natural vertex of the particular tetrahedron will still be used.

Based on Equation 2 above, it can be seen that the further P is from a vertex, the smaller a corresponding weight value will be for that vertex, thereby lessening the vertex's influence on the deformation of point P. For example, in FIG. 7A, the weight value attributed to vertex $V_{0,0}$ will be greater than the weight value attributed to vertex $V_{1,0}$, since the inverse of the smaller distance from P will result in a larger weight value associated with vertex $V_{0,0}$ than the weight value associated with vertex $V_{1,0}$. Similarly for FIG. 7B, the weight value attributed to vertex $V_{2,0}$ will be greater than the weight value attributed to vertex $V_{3,0}$, since the inverse of the smaller distance from P will result in a larger weight value associated with vertex $V_{2,0}$ than the weight value associated with vertex $V_{3,0}$.

Using Equation 1 as applied to each of the tetrahedrons, a new deformation position of point P may be represented by a weighted sum of positions determined from the barycentric coordinates of point P with respect to each tetrahedron of a tessellated polyhedron by Equation 3 as follows, where i ranges from 0 to a total number of natural vertices of all tessellations for the polyhedron:

$$P = \frac{\sum W_i(\lambda_{i,0} V_{i,0} + \lambda_{i,1} V_{i,1} + \lambda_{i,2} V_{i,2} + \lambda_{i,3} V_{i,3} + O_i)}{\sum W_i} \quad \text{Equation 3}$$

Referring again to FIGS. 8A and 8B which show just two tessellation possibilities of a three-dimensional hexahedral-shaped polyhedron representation of the examples discussed in FIGS. 7A and 7B, it will be understood by those of ordinary skill that many more tessellations of the hexahedral-shaped polyhedron of FIGS. 8A, 8B are possible, but are omitted herein for brevity. Thus, Equation 3 will be applied to each tessellation possibility to determine a position of P based on blended barycentric coordinate values with respect to the different tetrahedra within the tessellated polyhedron.

It will be understood that this disclosure discusses determinations of a deformation with respect to a single point P at a single frame of a continuous animation over time. Thus, it will be understood that a number of different points within the polyhedron corresponding to points on a surface mesh of a character, object, or other element to be deformed may be identified at each frame to determine a deformation position of those points given a particular deformation applied to one or more control points of the control mesh. Additionally, it will be understood that different points of the surface mesh may pass through a particular volume or polyhedron over time, and at each frame the above disclosure may be applied to the particular points of the surface mesh which are enclosed or otherwise associated with each volume or polyhedron of the volumetric mesh. Further, the above disclosure may be repeated at every frame or other unit of movement to determine new positions for each point on the surface mesh being deformed.

The embodiments of the present disclosure may achieve much smoother deformations than the existing art to prevent undesired artifacts in response to complex deformations such as compression and stretching. Since each vertex or control point of the cage is weighted in the determination of deformed position P which is based on the blended volume-based barycentric coordinates of each tessellation possibility, adjustment of one control point may not generate harsh or abrupt deformations of P resulting in the undesired artifacts. A new value of each point P may be determined for every frame of the animation, where the positions of all vertices of the volumetric mesh and surface mesh values are updated at every frame. The volumetric mesh and the tessellations may be preprocessed and stored prior to performing the deformation and thus may not need to be recalculated at every frame.

For example, FIG. 9A shows a surface-attachment based or linear embedding example of a deformation applied to control point 901 of a volume 900 and the resulting position of the surface mesh 902 of the character or object in response to the deformation, where each point on 902 is represented by only a single barycentric coordinate. As shown, adjustment of the vertex 901 in a particular direction will result in a correspondingly attached point (not depicted) on the surface mesh 902 to be moved linearly if contained within $T_0$ as a weighted sum of $V_{0,0}$, $V_{0,1}$ and $V_{0,2}$. Points on 902 contained within $T_1$ remain unchanged since none of its vertices have been moved.

Figure 9B:
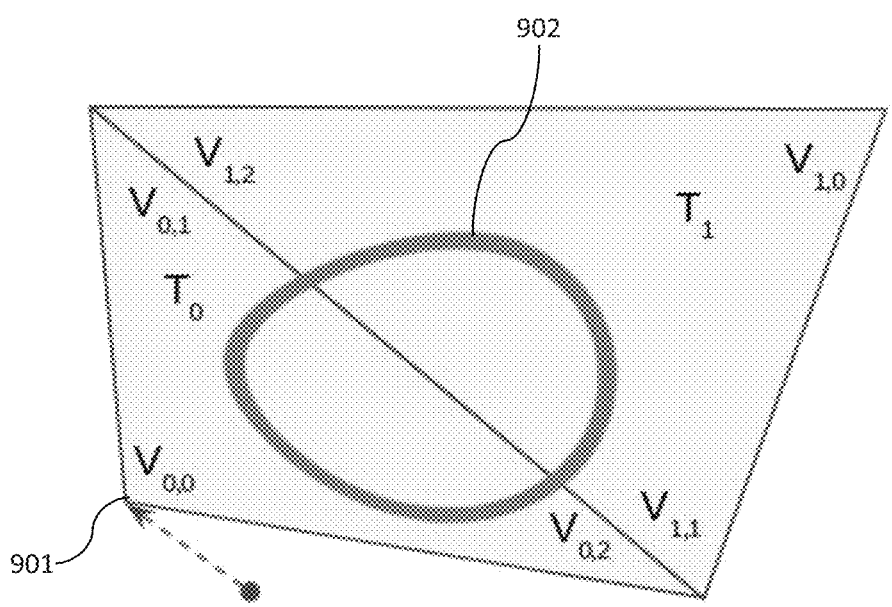

By contrast, FIG. 9B shows the same deformation applied to control point 901 according to the present disclosure. As discussed, the weight value of the vertices are considered and used to determine deformed positions of the surface mesh based on blended barycentric coordinate values with respect to all possible tessellations of polyhedron 900, resulting in a more smoothed and natural deformation of surface mesh 902 without undesirable artifacts as in FIG. 9A.

The present disclosure also considers various enhancements and smoothing techniques for improving deformations achieved by the above disclosure based on different variables or factors. In one embodiment, the exterior cage comprising the control points may be subdivided using subdividing smoothing rules prior to creating the volumetric mesh. This generates a higher resolution cage to generate smaller polyhedrons within the volumetric mesh, resulting in smoother deformations since the relative change in deformation of point P from one polyhedron to the next is reduced. An input parameter may be used or input to a system of an embodiment to define a degree of desired subdivision of the exterior cage, and the cage may be subdivided before each tessellation is determined. The tessellation possibilities and subdivision according to an input parameter may be precomputed and stored in memory for use during runtime during which the positions of P and weights are determined.

In another embodiment, another input parameter may be used to indicate a radius from point P wherein weight values are calculated and blended for any tetrahedron within the radius distance, and their contribution tapered off by a smooth interpolation between 1 at a distance of 0 from P and 0 at the distance of the radius. This embodiment will consider the effect of the deformation from all tetrahedrons within the falloff radius, such that additional tetrahedrons and control points are considered when determining the blended weight values for a particular deformation of point P. Accordingly, additional neighboring control points and weights will be factored into the deformation of point P, resulting in a smoother deformation.

In yet another embodiment, the connections between the control points of the cage and the points used to create the volume may be changed or moved to adjust the appearance of certain deformations. By changing these connections, the topology of the polyhedron of the volumetric mesh may be changed, and thus the tessellated tetrahedrons in each tessellation possibility will be changed with respect to point P. This will result in different and in some cases optimized— depending on the desired effect—deformation.

As an example, FIG. 10A and FIG. 10B show examples of different connections between the control points 1001a-1001e and the points 1002a-1002c associated with the character mesh 1000 discussed in FIG. 4. Specifically, in FIG. 10A, control points 1001a, 1001b are both connected to point 1002a and control points 1001c, 1001d, 1001e are all connected to point 1002c. However in certain embodiments, the connections between the control points of the cage and the points associated with the character mesh may be changed to achieve a different deformation appearance of the character mesh 1000, as shown in FIG. 10B.

In FIG. 10B, control point 1001a is still connected to point 1002a, however control point 1001b has been changed to be connected to point 1002b. As a result, a downward adjustment on the control point 1001b or surrounding points may result in a more pronounced curvature in the deformation of the character mesh 1000, as can be seen in FIG. 10B. Similarly, control points 1001c, 1001d are no longer connected to point 1002c, and are now connected to point 1002b. Thus, a similar deformation will result in a different deformation from that of FIG. 10A, in this case more pronounced curvature of the character model 1000.

Figure 11:
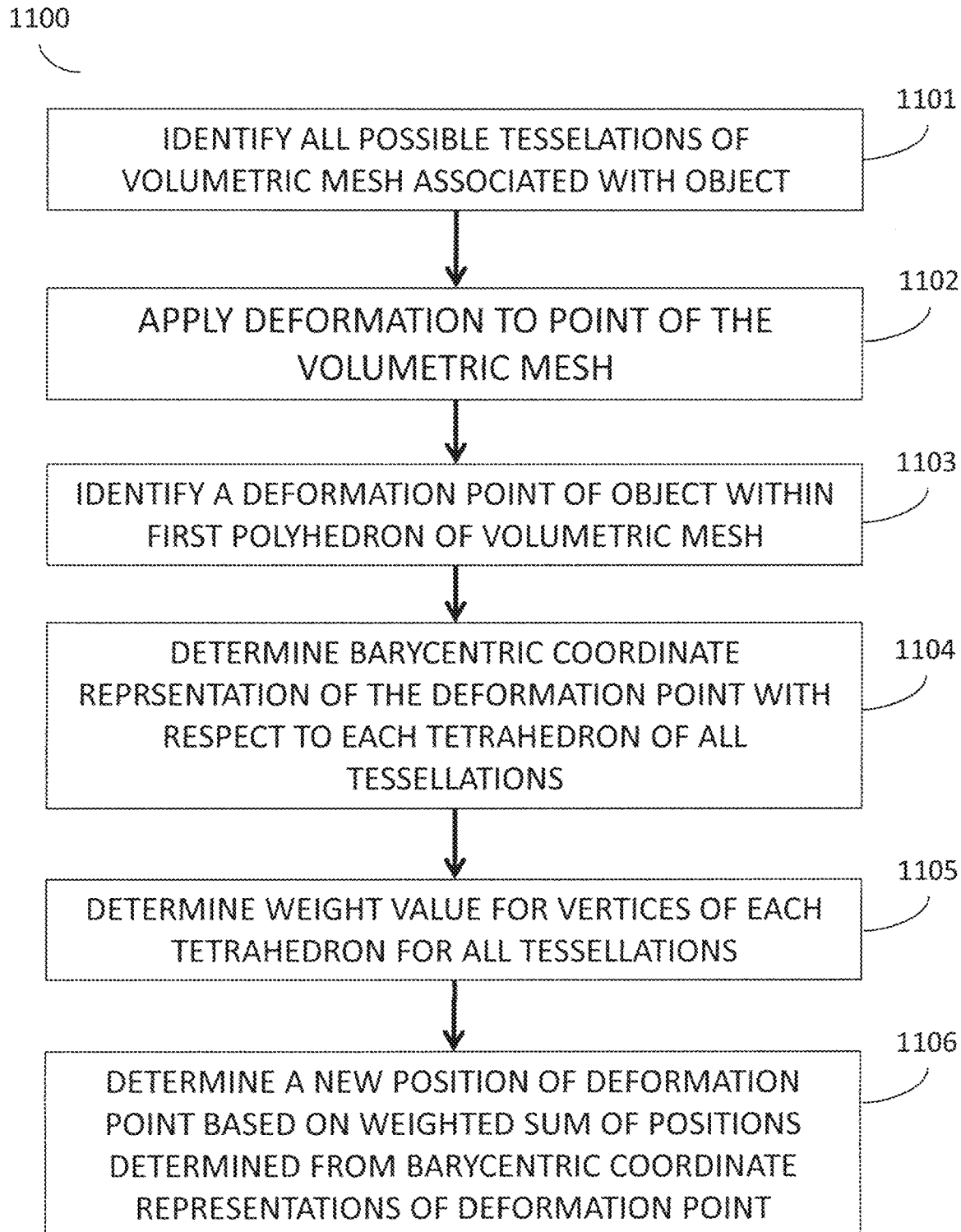
FIG. 11 is a flowchart showing a method according to an embodiment of the present disclosure.

Referring now to FIG. 11, a flowchart 1100 depicting an example of an embodiment of the present disclosure is provided. At block 1101, all possible tessellations are identified for a volumetric mesh associated with an object, and each tessellation is a tetrahedral mesh. In another aspect, a large number but less than all possible tessellations are identified for the volumetric mesh.

As discussed in the examples of FIG. 7A, 7B, 8A, 8B, artificial edges or surfaces may be inserted into the volumetric mesh associated with the object, where the volumetric mesh is defined by connections between points of the external cage and additional points (such as 1002a in FIG. 10A) to create a volume. As described, some embodiments will determine or use less than all possible tessellations, or a maximum number of tessellations may be set.

Once all (or a subset of) tessellations are identified, at block 1102, a deformation is applied to at least one point (e.g., a control point) on the volumetric mesh. As shown in the examples of FIGS. 9A, 9B, 10A, 10B, the applied deformation may be initiated by an input to one or more control points of the external cage associated with the object. The deformation may be initiated manually by a user or the deformation may be initiated as a result of a real-time or programmed action, movement, or other deformation of the object.

At block 1103, a deformation point referred to above as point P is identified within a polyhedron of the volumetric mesh. In an aspect, the polyhedron may be a hexahedron as shown in FIGS. 8A and 8B. As discussed with respect to the examples of FIGS. 4, 5, 7A, 7B, the deformation point may correspond to a point on a surface mesh of the object or character to be deformed. As discussed above, point P may be identified to be embedded within a polyhedron of the volumetric mesh, or in some cases, point P may be identified to be outside of the polyhedrons of the volumetric mesh, for example as shown in FIGS. 10A, 10B.

Then, at block 1104, barycentric coordinate values are determined for the deformation point with respect to each tetrahedron of all tessellations of the polyhedron. As discussed with respect to the examples of FIGS. 7A, 7B, 8A, 8B, barycentric coordinates are determined with respect to each of the tetrahedrons, and where the deformation point is determined to be outside of a particular tetrahedron, the barycentric coordinate of the closest point is computed as well as an offset vector from the closest point to the deformation point.

At block 1104, based on the identified deformation point, weight values are determined for each natural vertex of each tetrahedron for all tessellations. As discussed in the example of FIG. 7A, 7B, a weight value for a vertex is given by the inverse of a distance from the deformation point to the vertex. Further, in some embodiments the weight values are only determined for the natural vertices of the tetrahedron, found by locating the vertices adjacent to edges of the tetrahedron which connect a point of the exterior cage to a distinct point within (or associated with) the character mesh, or in some embodiments, vertices which are opposite from an inserted face.

At block 1106, a new position for the deformation point is determined given the determined weight values wherein the new position is determined as a weighted sum of positions determined from the barycentric coordinates of the deformation point with respect to each tetrahedron. In cases where the deformation point lies outside a tetrahedron, the offset vector computed in block 1104 is transformed by a local transformation computed for the tetrahedron or face of the tetrahedron which contains the closest point. As discussed in the examples of FIGS. 7A, 7B, 8A, 8B, the blend of the weight values and the determination of the position of the deformation point may be accomplished using Equation 3, as set forth and discussed above.

Figure 12:
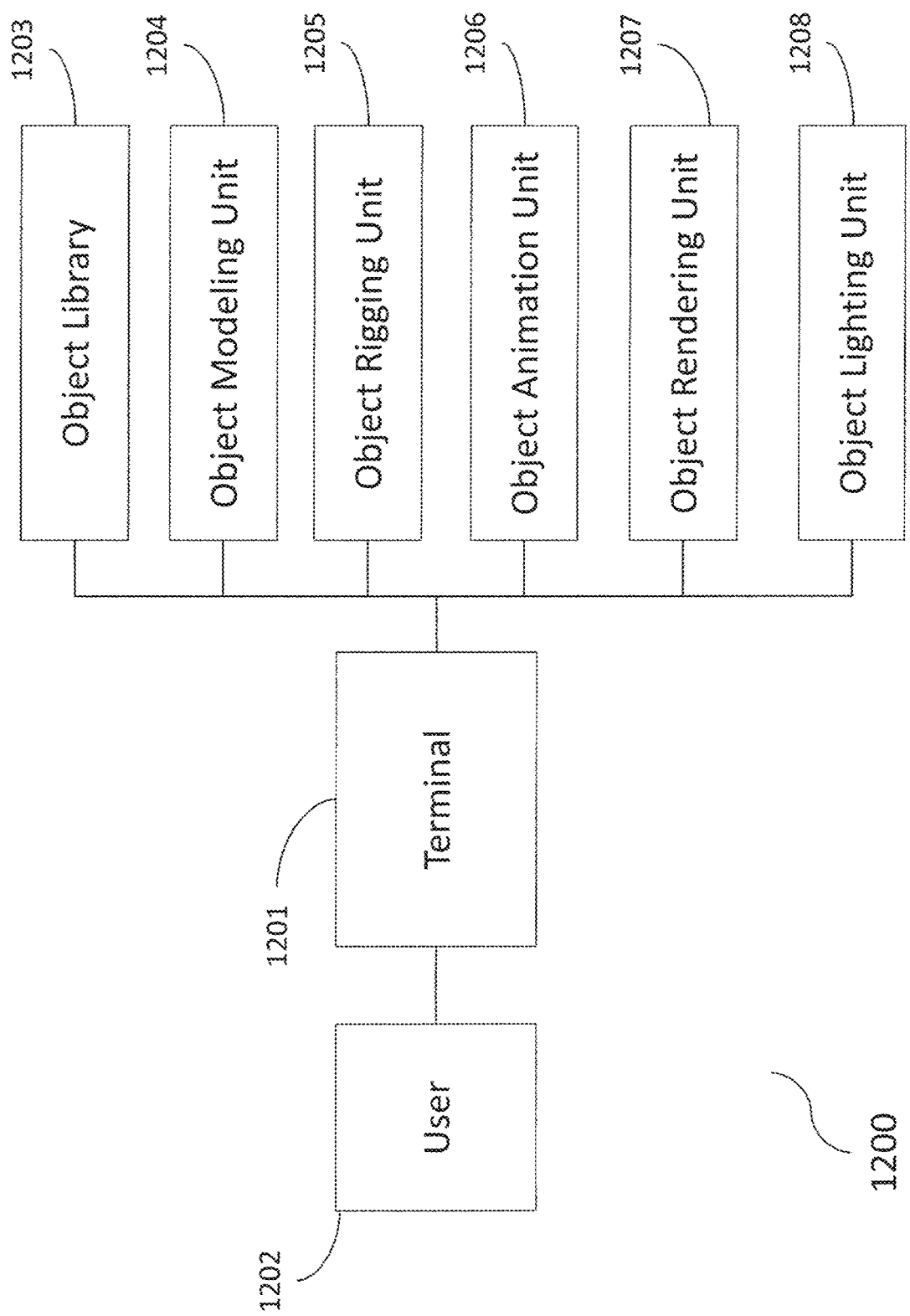
FIG. 12 is a diagram of a system implemented according to an embodiment of the present disclosure.

Referring now to FIG. 12, a simplified block diagram of a system 1200 for creating computer graphics imagery (CGI) and computer-aided animation is shown that may implement or incorporate various embodiments of the present disclosure. The system 1200 may include one or more terminals 1201. The one or more terminals 1201 may include hardware and software elements configured for designing CGI and assisting with computer-aided animation. The terminals 1201 may be implemented as a single computing device or a set of one or more computing devices, corresponding to computer hardware and/or software.

Examples of terminals 1201 may be desktop computers, laptop computers, workstation computers, mainframes, cluster computing systems, cloud computing terminals, embedded computing devices, computer graphics devices, gaming devices and consoles, video media playback devices, consumer electronic devices having programmable processors, or the like. The one or more terminals 1201 may be utilized at various stages of a production process, including pre-production, modeling, designing, creating, editing, simulating, animating, rendering, post-production, finishing, publishing, and the like, to produce recordings, computer files, tangible materials, and the like, related to or comprising images, image sequences, motion pictures, video, audio, or associated effects related to CGI and animation.

In an example of system 1200, a user 1202 may utilize the one or more terminals 1201 to design, create, or modify objects within a computer-generated interface displayed on display associated with the terminal 1201.

The terminal may implement, include, or otherwise be in operable communication with, systems and units including object library 1203, object modeling unit 1204, object rigging unit 1605, object animation unit 1206, object rendering unit 1207, and object lighting unit 1208. Object library 1203 may include software and/or hardware elements configured for storing and accessing information related to objects to be accessed, requested, retrieved, and/or used by the one or more terminals 1201 to design, create, and modify 3D models of objects in the CGI and animation processes.

Object modeling unit 1204 may include software and/or hardware elements and information to be accessed, requested, retrieved, and/or used by the one or more terminals 1201 to sculpt and design the 3D model to take on the desired appearance as instructed by user 1202, or other terminal operator during the CGI and animation process.

Object rigging unit 1205 may include software and/or hardware elements and information to be accessed, requested, retrieved, and/or used by the one or more terminals 1201 to design, create, or modify components of 3D models to define articulation points and movement ranges of various elements of the 3D model.

Object animation unit 1206 may include software and/or hardware elements and information to be accessed, requested, retrieved, and/or used by the one or more terminals 1201 to design, create, or modify animation aspects of a 3D model, including specifying the motion and position of various elements of the 3D model over time during the animation, such as specifying animation paths, cues, or the like or generating key frames or intermediary frames for animated motion of the 3D model.

Object rendering unit 1207 may include software and/or hardware elements and information to be accessed, requested, retrieved, and/or used by the one or more terminals 1201 to design, create, or modify a final appearance of the animated 3D model, including generating one or more images of one or more computer-generated objects, including textures, colors, rigging, controls, and the like.

Object lighting unit 1208 may include software and/or hardware elements and information to be accessed, requested, retrieved, and/or used by the one or more terminals 1201 to design, create, or modify lighting aspects of a 3D model and animated scenes, including defining lighting sources, shading, reflections, refractions, textures, colors, and the like.

The one or more terminals 1201 may be in communication with one or more server computers which may operatively in communication with one or more data stores (e.g., databases, indexes, files, or other data structures). The one or more server computers may connect to a data communication network comprising a local area network (LAN), a wide area network (WAN) (e.g., the Internet), a telephone network, a satellite or wireless communication network, or some combination of these or similar networks.

In selected embodiments, the one or more server computers may implement one or more processes, systems, or units of the animation system, including object library 1203, object modeling unit 1204, object rigging unit 1205, object animation unit 1206, object rendering unit 1207, object lighting unit 1208, and the like. The one or more terminals 1201, the one or more server computers, or any other aspect of the system 1200, may be associated or coupled with a display configured to display information, including a displayed interface for displaying, performing, executing, instructing, reviewing, and/or selecting operations of the present disclosure.

Figure 13:
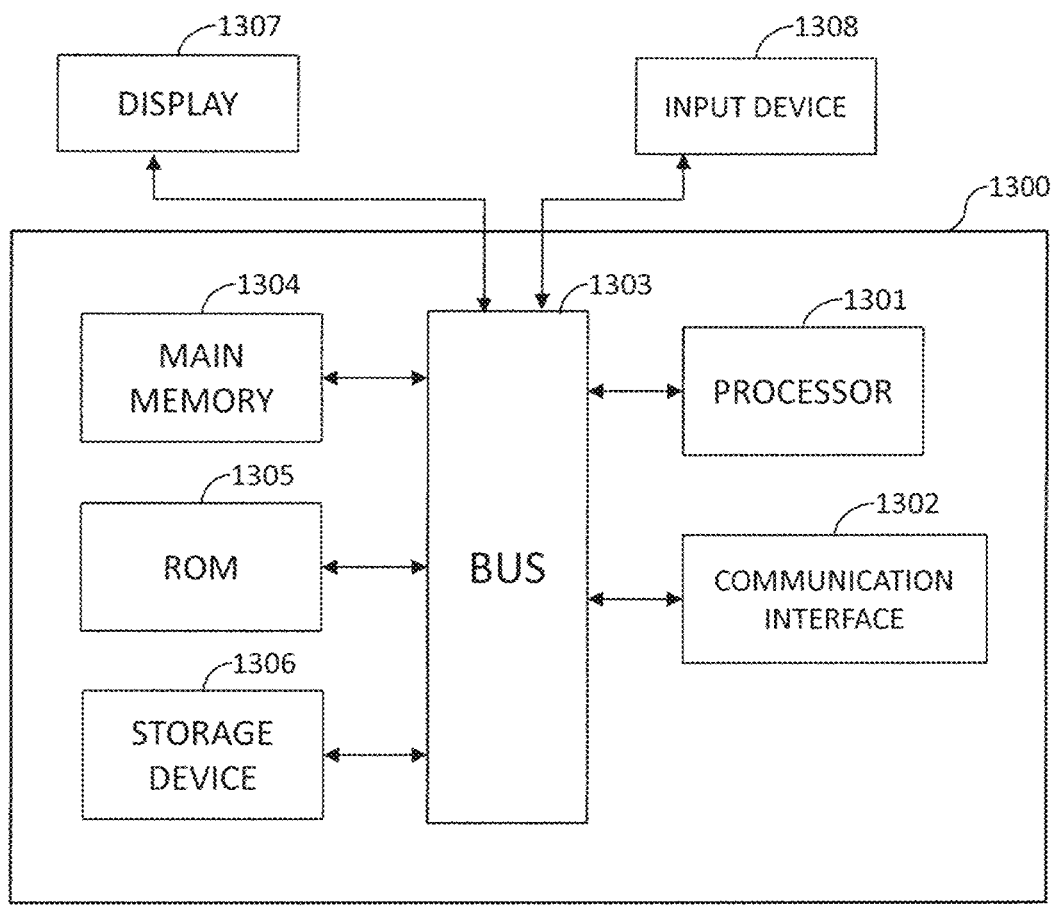
FIG. 13 is a diagram of an apparatus implemented according to an embodiment of the present disclosure.

Referring to FIG. 13, an illustration of an example computer 1300 is provided. One or more of aspects of the system 1200 discussed above in FIG. 12, such as the one or more terminals 1200 or the one or more server computers, may be configured as or include such a computer 1300. In selected embodiments, the computer 1300 may include a bus 1303 (or multiple buses) or other communication mechanism, a processor 1301, main memory 1304, read only memory (ROM) 1305, one or more additional storage devices 1306, and/or a communication interface 1302, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 1303 or other communication mechanism, including multiple such buses or mechanisms, may support communication of information within the computer 1300. The processor 1301 may be connected to the bus 1303 and process information. In selected embodiments, the processor 1301 may be a specialized or dedicated microprocessor configured to perform particular tasks in accordance with the features and aspects disclosed herein by executing machine-readable software code defining the particular tasks. Main memory 1304 (e.g., random access memory—or RAM—or other dynamic storage device) may be connected to the bus 1303 and store information and instructions to be executed by the processor 1301. Main memory 1304 may also store temporary variables or other intermediate information during execution of such instructions.

ROM 1305 or some other static storage device may be connected to a bus 1303 and store static information and instructions for the processor 1301. An additional storage device 1306 (e.g., a magnetic disk, optical disk, memory card, or the like) may be connected to the bus 1303. The main memory 1304, ROM 1305, and the additional storage device 1306 may include a non-transitory computer-readable medium holding information, instructions, or some combination thereof, for example instructions that when executed by the processor 1301, cause the computer 1300 to perform one or more operations of a method as described herein. A communication interface 1302 may also be connected to the bus 1303. A communication interface 1302 may provide or support two-way data communication between a computer 1300 and one or more external devices (e.g., other devices contained within the computing environment).

In selected embodiments, the computer 1300 may be connected (e.g., via a bus) to a display 1307. The display 1307 may use any suitable mechanism to communicate information to a user of a computer 1300. For example, the display 1307 may include or utilize a liquid crystal display (LCD), light emitting diode (LED) display, projector, or other display device to present information to a user of the computer 1300 in a visual display. One or more input devices 1308 (e.g., an alphanumeric keyboard, mouse, microphone, stylus pen) may be connected to the bus 1303 to communicate information and commands to the computer 1300. In selected embodiments, one input device 1308 may provide or support control over the positioning of a cursor to allow for selection and execution of various objects, files, programs, and the like provided by the computer 1300 and displayed by the display 1307.

The computer 1300 may be used to transmit, receive, decode, display, or the like one or more video files. In selected embodiments, such transmitting, receiving, decoding, and displaying may be in response to the processor 1301 executing one or more sequences of one or more instructions contained in main memory 1304. Such instructions may be read into main memory 1304 from another non-transitory computer-readable medium (e.g., a storage device).

Execution of sequences of instructions contained in main memory 1304 may cause the processor 1301 to perform one or more of the procedures or steps described herein. In selected embodiments, one or more processors in a multi-processing arrangement may also be employed to execute sequences of instructions contained in main memory 1304. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 1301, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 1302 may provide or support external, two-way data communication to or via a network link. For example, a communication interface 1302 may be a wireless network interface controller or a cellular radio providing a data communication network connection. Alternatively, a communication interface 1302 may comprise a local area network (LAN) card providing a data communication connection to a compatible LAN. In any such embodiment, a communication interface 1302 may send and receive electrical, electromagnetic, or optical signals conveying information.

A network link may provide data communication through one or more networks to other data devices (e.g., one or more terminals 1201 as shown in the system 1200). For example, a network link may provide a connection through a local network of a host computer or to data equipment operated by an Internet Service Provider (ISP). An ISP may, in turn, provide data communication services through the Internet. Accordingly, a computer 1300 may send and receive commands, data, or combinations thereof, including program code, through one or more networks, a network link, and communication interface 1302. Thus, the computer 1300 may interface or otherwise communicate with a remote server, or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for dynamically deforming an object in real-time based on a volume, the method comprising:

applying a deformation to at least one point of a volumetric mesh associated with the object, wherein a plurality of tessellations of the volumetric mesh are identified and wherein each tessellation is a tetrahedral mesh;

identifying a deformation point to be deformed corresponding to the applied deformation, wherein the deformation point is associated with a first polyhedron of the volumetric mesh;

determining a barycentric coordinate representation of the identified deformation point with respect to each tetrahedron of a plurality of tessellations of the first polyhedron;

determining, for each tessellation of the first polyhedron, weight values with respect to the deformation point for natural vertices of each tetrahedron of the tessellation; and determining, based on the determined weight values, a new position of the identified deformation point represented as a weighted sum of positions determined from the barycentric coordinate representations of the identified deformation point with respect to each tetrahedron of the plurality of tessellations of the first polyhedron, wherein the weight value for a particular vertex of a tetrahedron with respect to the deformation point is determined by an inverse of a distance from the deformation point to the particular vertex.

2. The method of claim 1, wherein the plurality of tessellations comprise all tessellations of the volumetric mesh that are possible without splitting an edge of a polyhedron of the volumetric mesh.

3. The method of claim 1, wherein:
the volumetric mesh comprises connections between a first set of points of a polygonal control mesh of the object to a second set of points associated with the object; and
each polygon of the polygonal control mesh has a maximum of four sides.

4. The method of claim 1, wherein the deformation point is embedded within the first polyhedron of the volumetric mesh.

5. The method of claim 1, wherein the identified deformation point is outside of the first polyhedron.

6. The method of claim 5, further comprising:
computing a closest point on each tetrahedron of each tessellation to the identified deformation point outside the first polyhedron; and
determining barycentric coordinates for the closest point and an offset vector from the closest point to the identified deformation point,
wherein the barycentric coordinate representation of the identified deformation point corresponds to the determined barycentric coordinates for the closest point.

7. The method of claim 1, wherein the volumetric mesh comprises connections between a first set of points of a polygonal control mesh to a second set of points associated with the object and the polygonal control mesh is subdivided prior to identifying the plurality of tessellations of the volumetric mesh.

8. The method of claim 1, further comprising:
determining a weight value for vertices of additional tetrahedrons of the plurality of tessellations with respect to the deformation point, wherein the additional tetrahedrons are within a threshold radius from the deformation point; and
wherein the determined new position of the identified deformation point is based on a weighted sum of positions determined from the barycentric coordinate representations of the identified deformation point with respect to each tetrahedron of the first polyhedron and the additional tetrahedrons.

9. A machine-readable non-transitory medium having stored thereon machine-executable instructions for:
applying a deformation to at least one point of a volumetric mesh associated with an object to be deformed, wherein a plurality of tessellations of the volumetric mesh are identified and wherein each tessellation is a tetrahedral mesh;
identifying a deformation point to be deformed corresponding to the applied deformation, wherein the deformation point is associated with a first polyhedron of the volumetric mesh;
determining a barycentric coordinate representation of the identified deformation point with respect to each tetrahedron of a plurality of tessellations of the first polyhedron;
determining, for each tessellation of the first polyhedron, weight values with respect to the deformation point for natural vertices of each tetrahedron of the tessellation; and
determining, based on the determined weight values, a new position of the identified deformation point represented as a weighted sum of positions determined from the barycentric coordinate representations of the identified deformation point with respect to each tetrahedron of the plurality of tessellations of the first polyhedron,
wherein the weight value for a particular vertex of a tetrahedron with respect to the deformation point is determined by an inverse of a distance from the deformation point to the particular vertex.

10. The machine-readable non-transitory medium of claim 9, wherein the plurality of tessellations are identified as all tessellations of the volumetric mesh that are possible without splitting an edge of a polyhedron of the volumetric mesh.

11. The machine-readable non-transitory medium of claim 9, wherein:
the volumetric mesh comprises connections between a first set of points of a polygonal control mesh of the object to a second set of points associated with the object; and
each polygon of the polygonal control mesh has a maximum of four sides.

12. The machine-readable non-transitory medium of claim 9, wherein the volumetric mesh comprises connections between a first set of points of a polygonal control mesh of the object to a second set of points associated with the object and the polygonal control mesh is subdivided prior to identifying the plurality of tessellations of the volumetric mesh.

13. The machine-readable non-transitory medium of claim 9, wherein the stored machine-executable instructions further comprise instructions for:
determining a weight value for vertices of additional tetrahedrons of the plurality of tessellations with respect to the deformation point for each tessellation, wherein the additional tetrahedrons are adjacent to the first polyhedron and within a threshold radius from the deformation point; and
wherein the determined new position of the identified deformation point is based on a weighted sum of positions determined from the barycentric coordinate representations of the identified deformation point with respect to each tetrahedron of all possible tessellations of the first polyhedron and the additional tetrahedrons.

14. A method for dynamically deforming a set of deformation points in real-time based on a volume, the method comprising:
applying a deformation to at least one point of a volumetric mesh associated with the set of deformation points, wherein a plurality of tessellations of the volumetric mesh are identified and wherein each tessellation is a tetrahedral mesh;
identifying a deformation point of the set of deformation points to be deformed corresponding to the applied deformation, wherein the deformation point is associated with a first polyhedron of the volumetric mesh;
determining a barycentric coordinate representation of the identified deformation point with respect to each tetrahedron of a plurality of tessellations of the first polyhedron;
determining, for each tessellation of the first polyhedron, weight values with respect to the deformation point for natural vertices of each tetrahedron of the tessellation; and
determining, based on the determined weight values, a new position of the identified deformation point represented as a weighted sum of positions determined from the barycentric coordinate representations of the identified deformation point with respect to each tetrahedron of the plurality of tessellations of the first polyhedron, wherein the weight value for a particular vertex of a tetrahedron with respect to the deformation point is determined by an inverse of a distance from the deformation point to the particular vertex.

15. The method of claim 14, wherein the plurality of tessellations are identified as all tessellations of the volumetric mesh that are possible without splitting an edge of a polyhedron of the volumetric mesh.

16. The method of claim 14, wherein:
the volumetric mesh comprises connections between a first set of points of a polygonal control mesh of the set of deformation points to a second set of points associated with the set of deformation points; and
each polygon of the polygonal control mesh has a maximum of four sides.

17. A system for dynamically deforming an object in real-time based on a volume, the system comprising:
a display configured to display information; and
one or more controllers configured to:
receive an input of a deformation to at least one point of a volumetric mesh associated with the object, wherein a plurality of tessellations of the volumetric mesh are identified and wherein each tessellation is a tetrahedral mesh;
identify a deformation point to be deformed corresponding to the applied deformation, wherein the deformation point is associated with a first polyhedron of the volumetric mesh;
determine a barycentric coordinate representation of the identified deformation point with respect to each tetrahedron of a plurality of tessellations of the first polyhedron;
determine, for each tessellation of the first polyhedron, weight values with respect to the deformation point for natural vertices of each tetrahedron of the tessellation;
determine, based on the determined weight values, a new position of the identified deformation point represented as a weighted sum of positions determined from the barycentric coordinate representations of the identified deformation point with respect to each tetrahedron of the plurality of tessellations of the first polyhedron; and
cause the display to display the identified deformation point at the determined new position,
wherein the weight value for a particular vertex of a tetrahedron with respect to the deformation point is determined by an inverse of a distance from the deformation point to the particular vertex.

18. The system of claim 17, wherein the plurality of tessellations are identified as all tessellations of the volumetric mesh that are possible without splitting an edge of a polyhedron of the volumetric mesh.

19. The system of claim 17, wherein:
the volumetric mesh comprises connections between a first set of points of a polygonal control mesh of the object to a second set of points associated with the object; and
each polygon of the polygonal control mesh has a maximum of four sides.

* * * * *